United States Patent
Lee

(10) Patent No.: US 10,185,062 B2
(45) Date of Patent: Jan. 22, 2019

(54) LIGHT DIFFUSING SHEET

(71) Applicant: HyungSuk Lee, Seoul (KR)

(72) Inventor: HyungSuk Lee, Seoul (KR)

( * ) Notice: Subject to any disclaimer, the term of this patent is extended or adjusted under 35 U.S.C. 154(b) by 0 days.

(21) Appl. No.: 15/867,903

(22) Filed: Jan. 11, 2018

(65) Prior Publication Data
US 2018/0136373 A1  May 17, 2018

Related U.S. Application Data

(63) Continuation of application No. PCT/KR2016/007982, filed on Jul. 22, 2016.

(30) Foreign Application Priority Data

Jul. 27, 2015 (KR) .................. 10-2015-0105697

(51) Int. Cl.
*G02B 5/02* (2006.01)
*C09D 165/04* (2006.01)
*C09D 183/04* (2006.01)

(52) U.S. Cl.
CPC ......... *G02B 5/0221* (2013.01); *C09D 165/04* (2013.01); *C09D 183/04* (2013.01); *G02B 5/02* (2013.01)

(58) Field of Classification Search
CPC .. G02B 6/0038; G02B 5/0278; G02B 5/0242; G02B 5/02
USPC ....................................................... 359/599
See application file for complete search history.

(56) References Cited

U.S. PATENT DOCUMENTS

| 7,235,736 B1 | 6/2007 | Buller et al. |
| 7,720,347 B2 * | 5/2010 | Lee .................. G02B 6/0038 349/56 |
| 2011/0027567 A1 | 2/2011 | Kekicheff et al. |
| 2014/0087191 A1 | 3/2014 | Chua et al. |

FOREIGN PATENT DOCUMENTS

| JP | 2004-090516 A | 3/2004 |
| JP | 2009-530858 A | 8/2009 |
| JP | 2014-525134 A | 9/2014 |

(Continued)

OTHER PUBLICATIONS

International Search Report issued in PCT/KR2016/007982; dated Oct. 20, 2016.

(Continued)

*Primary Examiner* — Audrey Y Chang
(74) *Attorney, Agent, or Firm* — Studebaker & Brackett PC

(57) ABSTRACT

A light diffusing sheet according to an embodiment of the invention may be a light diffusing sheet that is formed on one side of a substrate and has a particular pattern formed on a surface thereof, where the light diffusing sheet may include a polydimethylsiloxane (PDMS) coating layer that is formed on one side of the substrate and a poly-chloro-p-xylene coating layer that is formed on one side of the polydimethylsiloxane (PDMS) coating layer with a pattern formed on its surface, the tensile strength of the polydimethylsiloxane (PDMS) coating layer is 10 to 60 psi, and a compressive force is applied on the polydimethylsiloxane (PDMS) coating layer when an interface is formed between the polydimethylsiloxane (PDMS) coating layer and the poly-chloro-p-xylene coating layer.

4 Claims, 4 Drawing Sheets

(56) References Cited

FOREIGN PATENT DOCUMENTS

| KR | 10-2011-0105119 A | 9/2011 |
| KR | 10-2013-0123529 A | 11/2013 |
| KR | 10-2014-0143801 A | 12/2014 |

OTHER PUBLICATIONS

Yu et al.; Contact Guidance of Cells using the Micro/Nanopatterns Created by Stretching Plasma Treated PDMS Membrane; Lecture and Proceedings on the 2011 Autumn Conference of the Korean Society of Mechanical Engineers; Nov. 2011; pp. 2757-2760.
Chou et al.; Imprint of sub-25 nm vias and trenches in polymers; Appl. Phys. Lett; 67 (21); Nov. 20, 1995; pp. 3114-3116.
Kumar et al.; Patterned Self-Assembled Monolayers and Meso-Scale Phenomena; American Chemical Society; Res.; vol. 28, No. 5; 1995; pp. 219-226.
Suh et al.; Capillary Force Lithography; Advanced Materials; vol. 13, No. 18; Sep. 14, 2001; pp. 1386-1389.
Bruinink et al.; Capillary Force Lithography: Fabrication of Functional Polymer Templates as Versatile Tools for Nanolithography; Advanced Functional Materials; vol. 16; 2006; pp. 1555-1565.

\* cited by examiner

FIG. 5
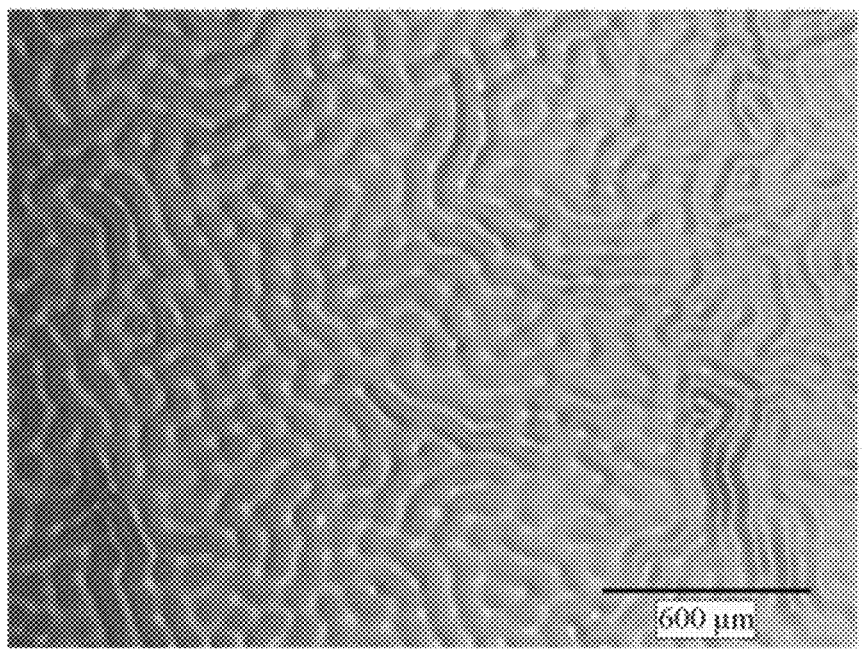
FIG. 6A  FIG. 6B  FIG. 6C
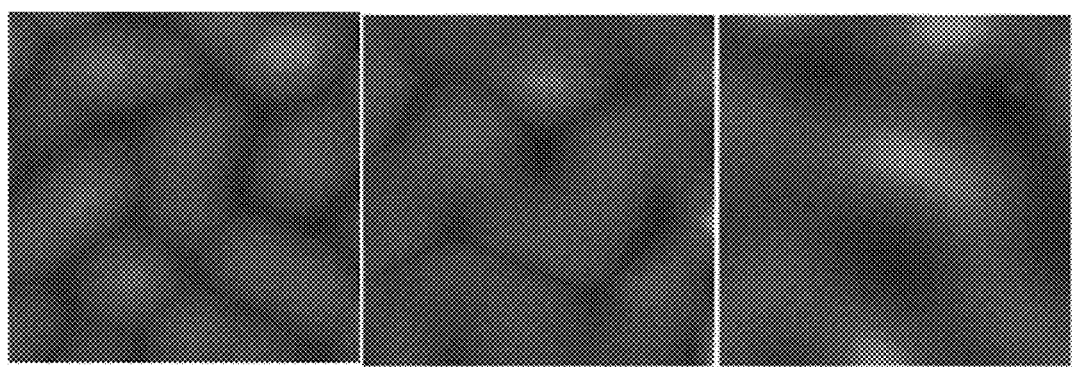

LIGHT DIFFUSING SHEET

CROSS-REFERENCE TO RELATED APPLICATIONS

This application is a Continuation Application of PCT International Application No. PCT/KR2016/007982, which was filed on Jul. 22, 2016, and which claims priority from Korean Patent Application No. 10-2015-0105697 filed with the Korean Intellectual Property Office on Jul. 27, 2015. The disclosures of the above patent applications are incorporated herein by reference in their entirety.

BACKGROUND

1. Technical Field

The present invention relates to a light diffusing sheet, more particularly to a light diffusing sheet that includes an organic polymer layer.

2. Description of the Related Art

Research efforts in recent times are focusing more on fine pattern manufacturing, rather than on existing photolithography processes, with the aim of manufacturing fine patterns in the order of micrometers or even nanometers.

In particular, since smaller sizes and high levels of integration of devices in semiconductor processes can reduce times, costs, and sample sizes, and are important for improving new functions, the demand for fine patterns is increasing dramatically. Rapid growth in LED lighting, LED based display devices, OLED lighting, and OLED display devices are also contributing to the demand for light diffusing sheets and light guiding plates.

As such, techniques such as electron-beam (e-beam) lithography, x-ray lithography, etc., for manufacturing fine patterns at the nanometer scale are being researched, with similar methods being used for manufacturing fine patterns at the micrometer scale. However, such processes for manufacturing fine patterns may entail problems such as expensive equipment and long process times. The level of productivity achieved with these methods is extremely low.

Recently, there has been research on improving productivity by using an imprinting process to duplicate patterns with a relatively simple method (S. Y. Chou et al., Appl. Phys. lett., 67: 3114, 1995). There has also been research involving using an elastomeric polymer known as PDMS (polydimethylsiloxane) to fabricate a mold and then coating a wet etching substance or an etching resist substance over an embossed surface and directly printing onto the surface of a secondary substrate to obtain the desired pattern in the secondary substrate or contacting the secondary substrate and filling the mold with a patterning material to create an inverted pattern on the secondary substrate (A. Kumar et al., Acc. Chem. Res., 28: 219, 1995).

Also, there has been disclosed a technique of positioning a polymer mold, which has been duplicated from a silicone mold, over a substrate having a polymer thin film and applying heat so that a polymer pattern may be formed by capillary action (K. Y. Suh et al., Advanced Materials, 13: 1386, 2001).

A technique of adjusting the size of a pattern by using a wet etching method during the transposition of the pattern (C. M. Bruinink et al., Adv. Funct. Mater. 16: 1555, 2006). Here, the polymer pattern is maintained as is and used as an etching resist mask, and a selective etchant is used to alter the size of the pattern being transposed onto the substrate according to the reaction time. However, with wet etching methods, it may be more difficult to finely control the size compared to dry etching methods such as reactive ion etching (RIE), and there is also the drawback of high unit cost associated with preparing molds for various patterns.

Moreover, although methods that do not require photolithography apparatus, such as those using nanoimprinting, microcontact printing using PDMS, and capillary lithography, may be useful for the mass-duplication of one type of fine pattern, these methods entail the difficulty of having to newly fabricate basic design molds when changing the type of pattern is necessary.

Thus, to resolve the problems above, there is an urgent need in the relevant field for technology that allows the production of fine patterns in varying sizes and shapes using simple processes and low costs.

SUMMARY OF THE INVENTION

An objective of the present invention is to provide a light diffusing sheet that can be manufactured with a relatively simple method. Another objective of the invention is to provide a light diffusing sheet that allows reductions in time and cost when manufacturing lighting or display devices.

A light diffusing sheet according to an embodiment of the invention may be a light diffusing sheet that is formed on one side of a substrate and has a particular pattern formed on a surface thereof, where the light diffusing sheet may include a polydimethylsiloxane (PDMS) coating layer that is formed on one side of the substrate and a poly-chloro-p-xylene coating layer that is formed on one side of the polydimethylsiloxane (PDMS) coating layer with a pattern formed on its surface, the tensile strength of the polydimethylsiloxane (PDMS) coating layer is 10 to 60 psi, and a compressive force is applied on the polydimethylsiloxane (PDMS) coating layer when an interface is formed between the polydimethylsiloxane (PDMS) coating layer and the poly-chloro-p-xylene coating layer.

A light diffusing sheet according to an embodiment of the invention does not require molding, lithography, UV irradiation or a heat treatment procedure, so that its manufacturing time and manufacturing unit cost can be inexpensive.

Also, when a substrate of a flexible material is used, it is possible to apply the light diffusing sheet to flexible devices or wearable devices.

Also, the light diffusing sheet can be used as a material for diffusing light regardless of the type of light source.

Furthermore, the manufacturing procedure can be performed at normal temperature, allowing application to light sources that are sensitive to high temperatures.

Additional aspects and advantages of the present invention will be set forth in part in the description which follows, and in part will be obvious from the description, or may be learned by practice of the invention.

BRIEF DESCRIPTION OF THE DRAWINGS

FIG. 5 is an actual image of the surface of the poly-chloro-p-xylene coating layer when the tensile strength of the PDMS coating layer is approximately 57.98 psi, as captured with an optical microscope.

FIGS. 6A, 6B and 6C show actual images of the surface of the poly-chloro-p-xylene coating layer, as captured with an AFM (atomic force microscope).

DETAILED DESCRIPTION OF THE INVENTION

Figure 1:
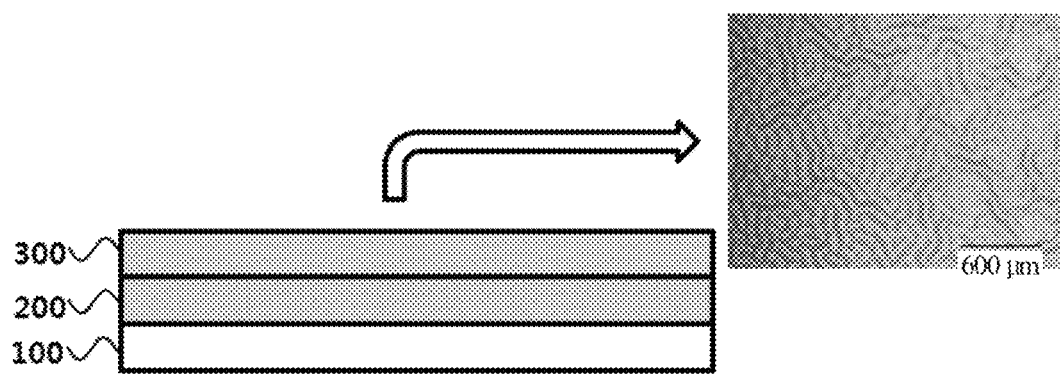
FIG. 1 is a cross-sectional view schematically illustrating a light diffusing sheet according to an embodiment of the invention.

Descriptions of specific structures or functions relating to certain embodiments derived based on the concept of the present invention as set forth in the present specification are provided merely as examples for explaining the embodiments derived from the concept of the invention. The embodiments can be practiced in a variety of implementations and are not limited to the embodiments described herein.

As the embodiments derived from the concept of the present invention allow for various modifications and can be implemented in various forms, certain embodiments are illustrated in the drawings and described in detail in the present specification. However, this is not intended to limit the embodiments derived from the concept of the invention to the specific disclosed forms, and it is to be appreciated that all modifications, equivalents, and substitutes that do not depart from the spirit and technical scope of the present invention are encompassed in the present invention.

While such terms as "first" and "second," etc., may be used to describe various components, such components must not be limited to the above terms. The above terms are used only to distinguish one component from another. For example, a first component may be referred to as a second component without departing from the scope of rights of the present invention, and likewise a second component may be referred to as a first component.

When a component is mentioned to be "connected" or "joined" to another component, this may mean that it is directly connected or joined to the other element, but it is to be understood that yet another component may exist in-between. On the other hand, when a component is mentioned to be "directly connected" or "directly joined" to another component, it is to be understood that there are no other components in-between. The same applies to other expressions describing the relationships of components, such as "between" and "immediately between" or "neighboring" and "directly neighboring".

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined, all terms used herein, including technical or scientific terms, have the same meanings as those generally understood by those with ordinary knowledge in the field of art to which the present invention pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

Certain embodiments of the present invention are described below in more detail with reference to the accompanying drawings.

FIG. 1 is a cross-sectional view schematically illustrating a light diffusing sheet according to an embodiment of the invention.

As illustrated in FIG. 1, a light diffusing sheet according to an embodiment of the invention may be a light diffusing sheet that is formed on one side of a substrate 100 and has a particular pattern formed on its surface. The light diffusing sheet may include a polydimethylsiloxane (PDMS) coating layer (hereinafter referred to as a "PDMS coating layer") that is formed on one side of the substrate 100 and a poly-chloro-p-xylene coating layer 300 that is formed on one side of the PDMS coating layer 200 and has the pattern formed thereon, where the tensile strength of the PDMS coating layer 200 may be 10 psi to 60 psi, and a particular compressive force may be applied on the poly-chloro-p-xylene coating layer 300 when the interface is formed between the PDMS coating layer 200 and the poly-chloro-p-xylene coating layer 300.

To be more specific, the pattern may be formed as the compressive force is applied horizontally on the surface formed by the poly-chloro-p-xylene coating layer.

The substrate 100 used in a light diffusing sheet according to an embodiment of the invention may be a commonly used transparent substrate and can be a transparent glass substrate, a transparent plastic substrate, or the like. There is no limit as to what materials can be used for the substrate 100, especially if the substrate is of a transparent material having superior light transmittance.

The PDMS coating layer 200 can be formed over an upper surface of the substrate, as in FIG. 1, and can be formed over the entire surface of or over a portion of the substrate. Various methods can be used for forming the PDMS coating layer 200 on the substrate surface; for example, spin coating can be applied, with the substrate rotated while a PDMS solution is dropped onto the substrate.

In particular, the components of the PDMS coating layer 200 can include at least one organic polymer selected from a group consisting of silicone rubber, silicone latex, latex, dimethyl silicone, dimethyl polysiloxane, and methyl silicone.

Polydimethylsiloxane (PDMS) is an organic polymer material having a molecular weight of 162.38, a melting point of −40~50 □, a boiling point of 205 □, and a density of 0.76 g/ml, and the properties of the material itself include transparency, permeability with respect to liquids and vapors, low surface energy, inertness, and flexibility.

In particular, when polydimethylsiloxane is formed over a substrate, it can be adhered in a stable manner over a relatively large area and can be adhered in a stable manner even on a substrate having an uneven surface. Moreover, polydimethylsiloxane is an elastomer having high endurance and is capable of being elongated to several times its length when pulled by an external force and returning to its original length when the external force is removed.

When polydimethylsiloxane is in a flexible state before curing, it is a PDMA A substance, and after curing, the PDMS strands lump together to become PDMS kit B. If a UV/ozone, plasma treatment is applied to the surface of PDMS, the carbon molecules and organic molecules on the surface disappear and a silicon oxide layer is created, forming a hard surface.

A PDMS coating layer 200 made of polydimethylsiloxane according to an embodiment of the invention can have a tensile strength of 10 to 60 psi.

The tensile strength of the PDMS coating layer 200 is an important factor that determines whether or not a pattern can be formed on the poly-chloro-p-xylene coating layer 300 described below by the interaction at the interface when the poly-chloro-p-xylene coating layer 300 is coated on. A more detailed description on this is provided below.

Poly-chloro-p-xylene, from which the poly-chloro-p-xylene coating layer 300 is made, is a colorless liquid at normal temperature having a melting point of approximately 2 ☐ and a boiling point of 184~185 ☐.

EXAMPLE 1

Range of Tensile Strength for Pattern Forming

A light diffusing sheet according to an embodiment of the invention may have a pattern formed on the poly-chloro-p-xylene coating layer 300 as the poly-chloro-p-xylene coating layer 300 is formed over the PDMS coating layer 200. In order for a pattern to be formed thus, the condition that tensile strength of the PDMS coating layer 200 be 10~60 psi must be satisfied, as described above.

When the poly-chloro-p-xylene coating layer 300 is deposited over the PDMS coating layer 200, a change occurs due to a physical force at the interface between the two polymer substances. In the poly-chloro-p-xylene coating layer 300, a compressive force occurs which affects the interface, where the compressive force causes the PDMS coating layer 200 together with the poly-chloro-p-xylene coating layer 300 to form wrinkles of a certain pattern.

In other words, the compressive force may become the driving force forming the pattern on the poly-chloro-p-xylene coating layer 300.

However, since polydimethylsiloxane (PDMS) has a low interfacial free energy, the adhesion between polymers is not relatively strong. Thus, if the compressive force of the poly-chloro-p-xylene coating layer 300 is applied as is on the PDMS coating layer 200, the PDMS coating layer 200 and the poly-chloro-p-xylene coating layer 300 may become separated.

Figure 2:
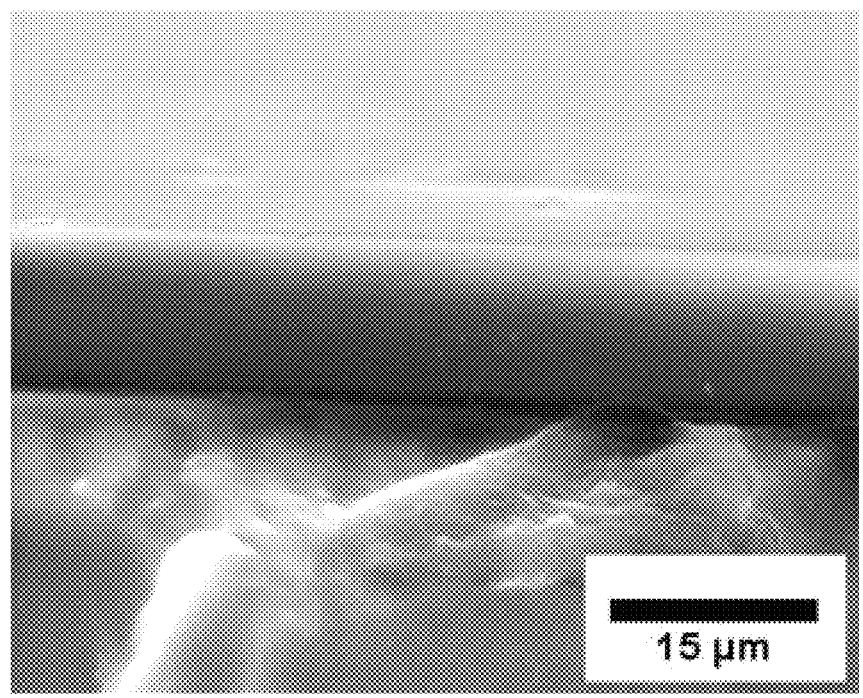
FIG. 2 is an actual image of the cross section at the interface when the tensile strength of the PDMS coating layer is approximately 9.3 psi, as captured with an electron microscope.

FIG. 2 is an actual image of the cross section at the interface when the tensile strength of the PDMS coating layer is approximately 9.3 psi, as captured with an electron microscope.

From FIG. 2, it can be seen that, when the tensile force of the PDMS coating layer 200 is less than 10 psi, the PDMS coating layer 200 may become detached by the compressive force of the poly-chloro-p-xylene coating layer 300. If the PDMS coating layer 200 is separated, a pattern cannot be formed on the poly-chloro-p-xylene coating layer 300, and even if a pattern is formed, the cavities formed between the poly-chloro-p-xylene coating layer 300 and the PDMS coating layer 200 may cause problems of durability or may cause alterations in the coating layer which lower light diffusion efficiency.

Figure 3:
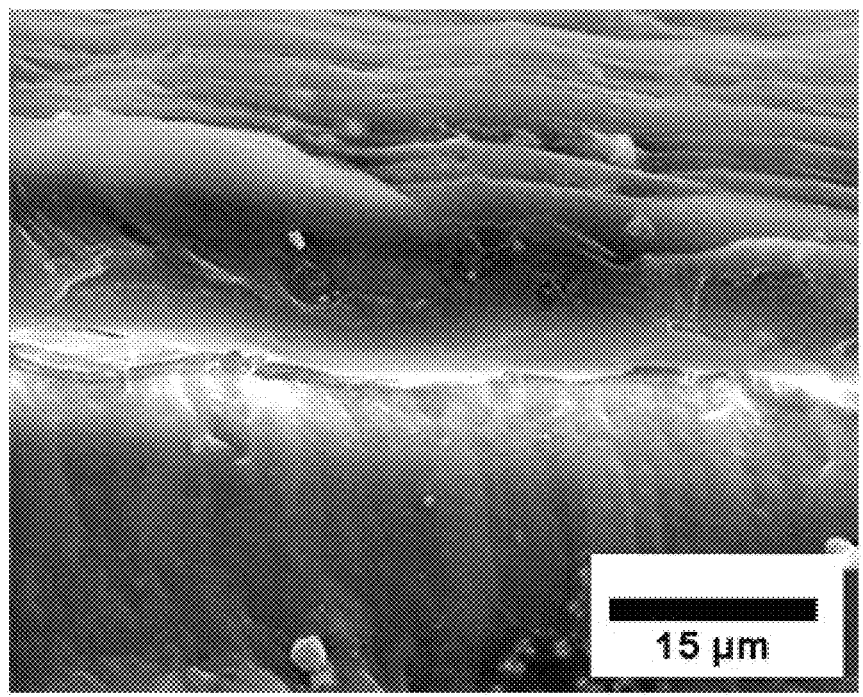
FIG. 3 is an actual image of the cross section at the interface when the tensile strength of the PDMS coating layer is approximately 10.27 psi, as captured with an electron microscope.

FIG. 3 is an actual image of the cross section at the interface when the tensile strength of the PDMS coating layer is approximately 10.27 psi, as captured with an electron microscope.

From the case in which the tensile strength of the PDMS coating layer 200 is approximately 10.27 psi, as shown in FIG. 3, it can be seen that the PDMS coating layer 200 is completely attached by the compressive force of the poly-chloro-p-xylene coating layer 300.

It can be analyzed that the compressive force occurring during the deposition of the poly-chloro-p-xylene coating layer 300 is offset by the tensile force of the PDMS coating layer 200 to such an extent that the compressive force applied on the PDMS coating layer 200 is not sufficient to detach the two layers.

Figure 4:
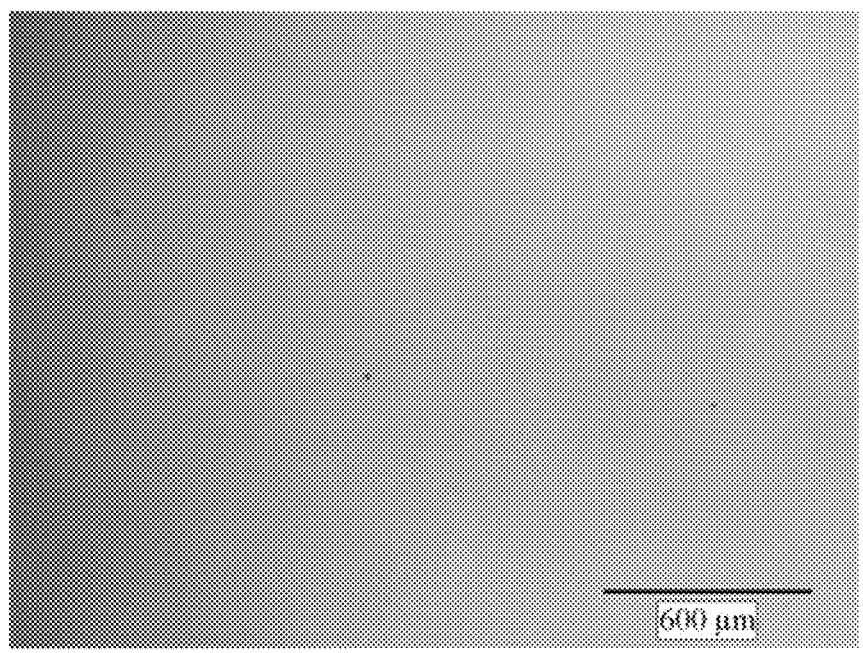
FIG. 4 is an actual image of the surface of the poly-chloro-p-xylene coating layer when the tensile strength of the PDMS coating layer is approximately 72.3 psi, as captured with an optical microscope.

FIG. 4 is an actual image of the surface of the poly-chloro-p-xylene coating layer when the tensile strength of the PDMS coating layer is approximately 72.3 psi, as captured with an optical microscope.

FIG. 5 is an actual image of the surface of the poly-chloro-p-xylene coating layer when the tensile strength of the PDMS coating layer is approximately 57.98 psi, as captured with an optical microscope.

A high tensile strength of the PDMS coating layer 200 would mean that the level of viscosity of the PDMS coating layer 200 is decreased. The chemical formula for polydimethylsiloxane is $[—Si(CH_3)_2O—]n$, where the viscosity of the polydimethylsiloxane can be adjusted according to the number n.

In cases where the tensile strength of the PDMS coating layer is comparatively high as in FIG. 4, the compressive force applied at the poly-chloro-p-xylene coating layer 300 may be canceled out by the tensile force, or even if it is not canceled out, may not be sufficient to cause a deformation that reaches the upper surface of the poly-chloro-p-xylene coating layer 300 to form a pattern. In FIG. 4, it can be seen that there is no pattern formed at all on the poly-chloro-p-xylene coating layer 300.

In contrast, if the tensile force of the PDMS coating layer 200 is approximately 57.98 psi as in FIG. 5, it can be seen that the deposition of the poly-chloro-p-xylene coating layer 300 has caused a compressive force to be applied at the interface, resulting in the forming of a pattern of a certain width.

EXAMPLE 2

Adjustment of Pattern Width

The greater the thickness of the poly-chloro-p-xylene coating layer 300, the greater may be the pattern width of the poly-chloro-p-xylene coating layer 300.

It is deemed that the change in the poly-chloro-p-xylene coating layer 300 caused by the force physically applied on the interface between the PDMS coating layer 200 and the poly-chloro-p-xylene coating layer 300 is affected up to a surface having a particular thickness, and that the compressive force of the poly-chloro-p-xylene is also strongly applied between polymer chains. That is, it is understood that the cross linking between polymer chains may be affected by the physical change at the interface, and this in turn may have an effect that reaches up to the upper surface.

This can be observed from FIG. 6A, FIG. 6B, FIG. 6C and FIG. 7 associated with Example 2.

AFM images were taken of the surface of the poly-chloro-p-xylene coating layer 300, using samples having the dimensions horizontal×vertical=50 μm×50 μm, for cases in which the thicknesses of the poly-chloro-p-xylene coating layer 300 are 3 μm, 12 μm, and 28 μm.

FIG. 6A, FIG. 6B and FIG. 6C shows actual images of the surface of the poly-chloro-p-xylene coating layer, as captured with an AFM (atomic force microscope).

Figure 7:
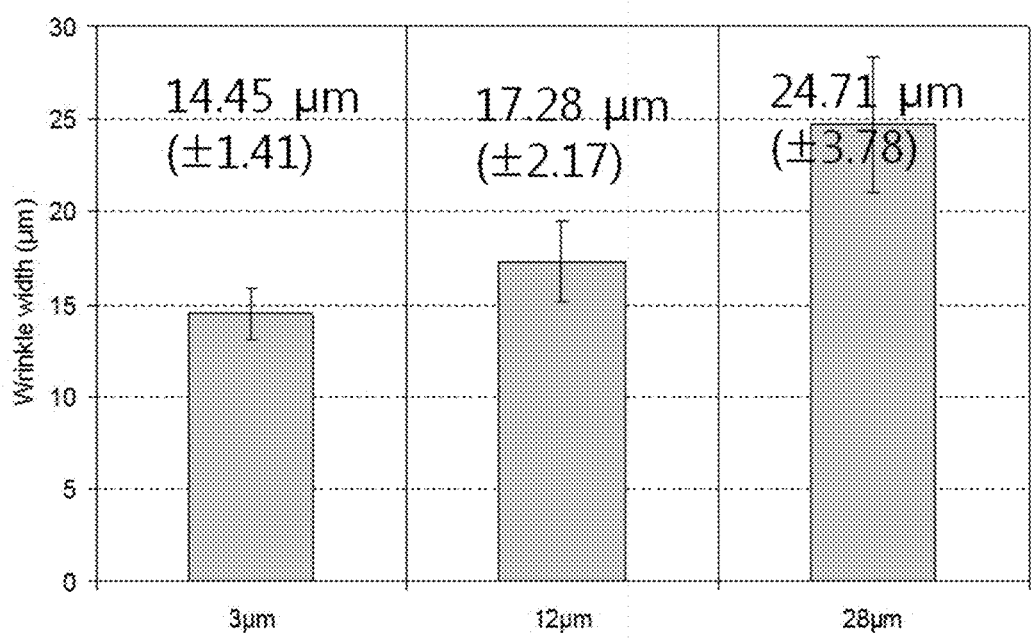
FIG. 7 is a graph representing changes in pattern width according to the thickness of the poly-chloro-p-xylene coating layer.

FIG. 7 is a graph representing changes in pattern width according to the thickness of the poly-chloro-p-xylene coating layer.

As illustrated in drawing FIG. 6A and FIG. 7, for the case in which the thickness of the poly-chloro-p-xylene coating layer 300 is 3 μm, the average pattern width formed on the surface of the poly-chloro-p-xylene coating layer 300 is 14.45 μm. For the case in which the thickness of the poly-chloro-p-xylene coating layer 300 is 12 μm, as seen in drawing FIG. 6B and FIG. 7, the average pattern width formed on the surface of the poly-chloro-p-xylene coating layer 300 is 17.28 μm, and for the case in which the thickness of the poly-chloro-p-xylene coating layer 300 is 28 μm, as seen in drawing FIG. 6C and FIG. 7, the average pattern width formed on the surface of the poly-chloro-p-xylene coating layer 300 is 24.71 μm.

Ultimately, depending on the usage of the light diffusing sheet according to an embodiment of the invention, it is possible to easily change the width of the pattern by adjusting the thickness of the poly-chloro-p-xylene coating layer 300.

Although certain preferred embodiments of the present invention are illustrated and described in the foregoing, the present invention is not limited to the specific preferred embodiments described above. It is obvious that those of ordinary skill in the field of art to which the present invention pertains can provide numerous variations without departing from the essence of the present invention as defined by the scope of claims and that such variations are encompassed within the scope defined by the claims.

What is claimed is:

1. A light diffusing sheet formed on one side of a substrate and having a pattern formed on a surface thereof, the light diffusing sheet comprising:
   a polydimethylsiloxane (PDMS) coating layer formed on one side of the substrate, the polydimethylsiloxane (PDMS) coating layer having a tensile strength of 10.27 to 57.98 psi; and
   a poly-chloro-p-xylene coating layer formed on one side of the polydimethylsiloxane (PDMS) coating layer, the poly-chloro-p-xylene coating layer having the pattern formed on a contact surface with the polydimethylsiloxane (PDMS) coating layer,
   wherein
      a pattern width, which is a distance between adjacent ridges of a plurality of ridges of the pattern of the poly-chloro-p-xylene coating layer, can be adjusted to increase by increasing a thickness of the poly-chloro-p-xylene coating layer,
      the thickness of the poly-chloro-p-xylene coating layer is 3 to 28 μm, and
      the pattern width of the poly-chloro-p-xylene coating layer is 14.45 to 24.71 μm.

2. The light diffusing sheet of claim 1, wherein components of the polydimethylsiloxane (PDMS) coating layer include at least one organic polymer selected from a group consisting of silicone rubber, silicone latex, latex, dimethyl silicone, dimethyl polysiloxane, and methyl silicone.

3. A light unit comprising the light diffusing sheet according to claim 2.

4. A light unit comprising the light diffusing sheet according to claim 1.

* * * * *